United States Patent [19]
Fromme

[11] 3,740,107
[45] June 19, 1973

[54] SHAFT BEARING
[75] Inventor: Hans-Georg Fromme, Wetzlar, Germany
[73] Assignee: Fromme Forderanlagen GmbH, Wetzlar, Germany
[22] Filed: Mar. 14, 1972
[21] Appl. No.: 234,574

[30] Foreign Application Priority Data
Apr. 21, 1971  Germany................. P 21 19 283.6

[52] U.S. Cl. .............................................. 308/26
[51] Int. Cl. ........................................... F16c 35/00
[58] Field of Search............................. 308/26, 184

[56] References Cited
FOREIGN PATENTS OR APPLICATIONS
956,739  4/1964  Great Britain...................... 308/26

Primary Examiner—Charles J. Myhre
Assistant Examiner—Frank Susko
Attorney—Krafft & Wells

[57] ABSTRACT

A bearing for a shaft is mounted by a rubber-metal connection in a rubber plate which has a thickness equal to the width of the bearing in axial direction. On two opposite edges the rubber plate is provided with grooves so that it can be inserted in an accordingly shaped opening of a shaft carrier. The rim of the opening constitutes the tongues which fit into the grooves. In the carrier the rubber plate is secured by a screwed-on retaining plate. This design allows for a ready and uncomplicated replacement of the bearing in case it has worn out.

3 Claims, 9 Drawing Figures

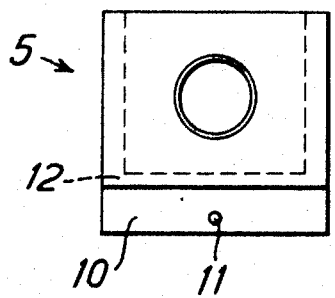
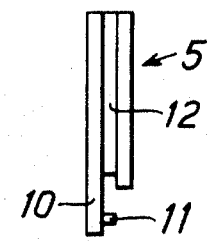
Fig. 5  Fig. 6
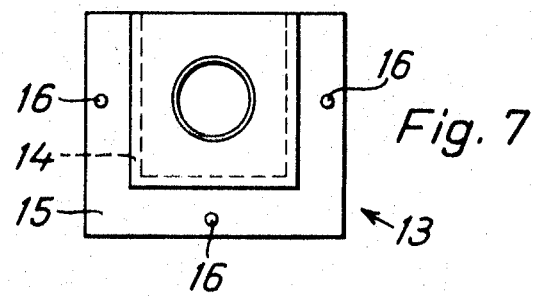
Fig. 7
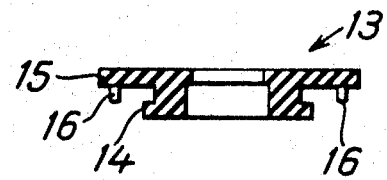
Fig. 8
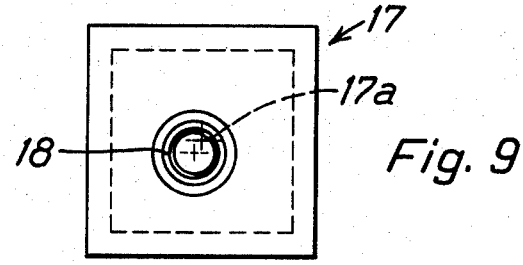
Fig. 9

SHAFT BEARING

BACKGROUND OF THE INVENTION

The present invention relates to a shaft bearing which is mounted in a rubber body by means of a rubber-metal connection.

It is already known in the art to mount shaft bearings in a rubber body whenever the vibration of the rotating shaft must not be transmitted to the shaft carrier which may, for example, be a frame construction. However, it has often proved difficult to replace worn-out bearings of this type on account of unsuitably designed holding elements for securing the bearing in the shaft carrier.

It is therefore an object of the present invention to provide a shaft bearing in a rubber body which can easily and in a simple manner be exchanged for another one in case the bearing has worn out.

SUMMARY OF THE INVENTION

According to the invention the above stated object is attained by mounting the bearing in a rubber plate which has a thickness of about the width of the bearing in axial direction. The bearing is fixed in the rubber plate by a rubber-metal connection. The rubber plate is provided with substantially parallel grooves along two opposite edges. The shaft carrier has an opening into which the rubber plate is inserted from one side in a groove and tongue connection wherein the rim of the opening represents the tongues.

The rubber plate may be of various shape. However, it must always be symmetrical and it must not have any undercuts so that the plate can be pushed into the opening from one side. Among such shapes are, for example, a hexogognal shape of which the upper triangle has been omitted, or a plate with two parallel sides and one side in the form of a triangle or a semicircle.

The thickness of the rim of the opening in the shaft carrier has to correspond to the width of the grooves in the rubber plate. Therefore the shaft carrier will preferably be constructed from material having a thickness which corresponds to the width of the grooves.

In many embodiments of the invented shaft bearing it will be advantageous to secure the rubber plate in the shaft carrier by a retaining plate, screwed against the free top of the rubber plate. Fastening of the plate in the carrier may further be improved by providing fastening pins in the groove walls projecting at right angles therefrom for engagement with holes in the shaft carrier. To this end one groove wall may be designed longer than the opposite wall so that it can easily be bent over backwards for inserting the pin into the hole.

In order to compensate for any differences in the position of the bearing from the nominal shaft position, which differences may occur on account of allowances in production, it is suggested to use a rubber plate of square shape wherein the bearing is mounted slightly off center. If, now, along the edges of the rubber plate four grooves are provided it will be possible to insert the rubber plate in the opening of the shaft bearing in four different ways. In many instances it will thereby be possible to correct the position of the bearing sufficiently in order to match the shaft position.

BRIEF DESCRIPTION OF THE DRAWINGS

The invention will be more readily comprehended from the following description when taken in conjunction with the appending drawings, wherein:

FIGS. 5 and 6 are a front view and a side view of one particular embodiment of a rubber plate comprising a fastening pin projecting from one groove wall, FIGS. 7 and 8 are a front view and a side view of one particular embodiment of a rubber plate comprising three fastening pins projecting from three different groove walls, and FIG. 9 shows a rubber plate with the ball bearing arranged slightly off center.

DESCRIPTION OF THE PREFERRED EMBODIMENTS

Figure 1:
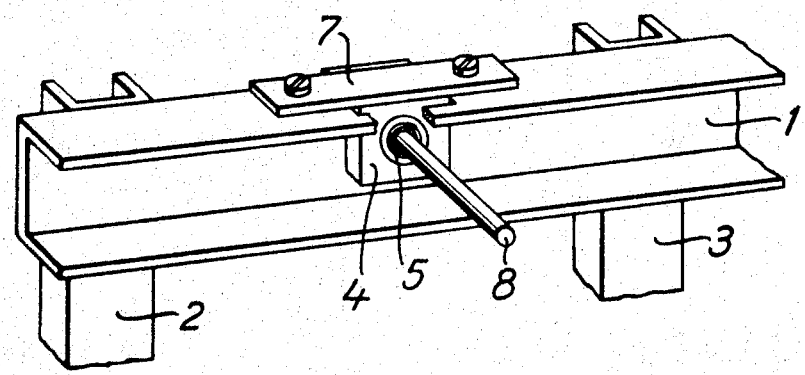
FIG. 1 shows a perspective view of a shaft carrier with a rubber plate with ball bearing inserted in an opening of the carrier.
Figure 2:
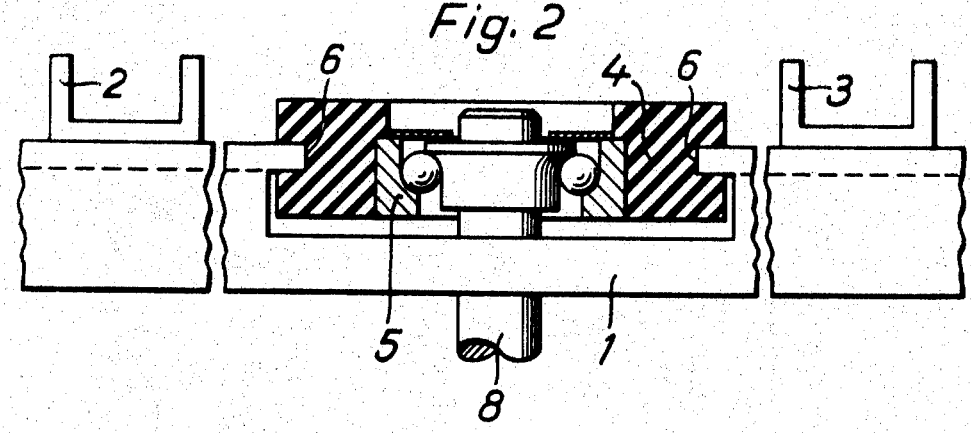
FIG. 2 is a sectional view on an enlarged scale of the ball bearing of FIG. 1, FIGS. 3 and 4 show the front view of two rubber plates of different shape.

Referring now to the drawings, the shaft carrier in FIG. 1 is a frame construction comprising a horizontal channel bar 1 and a first and a second vertical channel bar 2;3. In the channel bar 1 a portion of one flange and an adjoining portion of the vertical wall are cut out. In this opening a rubber plate 4 is inserted by means of grooves 6 in the edges of the rubber plate. On top the plate is secured by a retaining plate 7 which is screwed to the channel bar.

Figure 3:
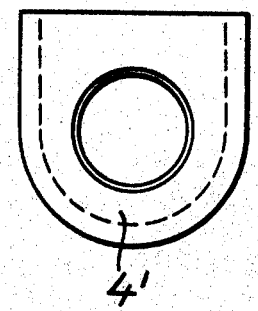
Figure 4:
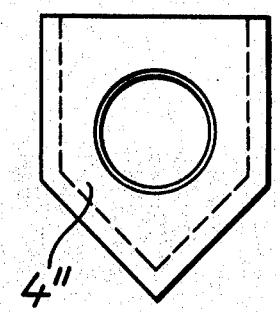

The FIGS. 3 and 4 show schematically two different embodiments 4' and 4'' of the rubber plate.

The rubber plate in the shaft carrier can also be secured by fastening pins which engage holes on the edge of the opening in the channel bar in the manner of a snap fastener.

The FIGS. 5 and 6 show the rubber plate 5 with grooves 12 at opposite edges and with one fastening pin 11 projecting from one groove wall at the lower side of the rubber plate.

In the FIGS. 7 and 8 a rubber plate is illustrated of which three groove walls 14 are longer than the respective opposite walls 15. From the longer walls 14 projects one fastening pin each which engage accordingly located holes in the channel bar.

In the rubber plate 17 in FIG. 9 the ball bearing 18 is positioned slightly off the center 17a. The rubber plate may be inserted into the opening in four different positions with eather side in front, according to the differences between the ball bearing position and the nominal shaft position. In this manner production tolerances may be compensated for.

What is claimed is:

1. A shaft bearing arranged in a rubber body and mounted on a shaft carrier, wherein the improvement comprises:
   a. a rubber body in the form of a rubber plate having a thickness of substantially the width of the shaft bearing in axial direction and having an outer shape suitable for inserting the rubber plate into an opening of the shaft carrier;
   b. at least two grooves in opposite edges of the rubber plate for inserting the plate into the shaft carrier in a tongue and groove connection, said grooves having one wall longer than an opposite wall, fastening pins in said longer walls for engagement with correspondingly arranged holes in said shaft carrier; and c. an opening in the shaft carrier into which the rubber plate is inserted with the outer shape of the opening corresponding to the outer shaft of the rubber plate and the rim of the opening corresponding in material thickness to the width of the grooves.

2. A shaft bearing as claimed in claim 1, and further comprising a retaining plate fastened to the shaft carrier for securing the rubber plate in the opening.

3. A shaft bearing as claimed in claim 1, wherein the bearing in the rubber plate is arranged off center.

* * * * *